United States Patent

[11] 3,601,611

| [72] | Inventor | James M. Kendall, Sr. |
| | | Pasadena, Calif. |
| [21] | Appl. No. | 848,880 |
| [22] | Filed | Aug. 11, 1969 |
| [45] | Patented | Aug. 24, 1971 |
| [73] | Assignee | California Institute of Technology |
| | | Pasadena, Calif. |

[54] PRIMARY ABSOLUTE RADIOMETER
19 Claims, 4 Drawing Figs.

[52] U.S. Cl. .................................................. 250/83.3 H,
73/355, 73/361, 250/83.3 R
[51] Int. Cl. .................................................. G01t 1/16
[50] Field of Search .......................................... 250/83.3
IR; 73/355, 361

[56] References Cited
UNITED STATES PATENTS
3,225,632 6/1966 Brooks ........................... 250/83.3 IR
3,282,100 12/1966 Baker ............................ 250/83.3 IR
3,387,134 6/1968 Treharne ....................... 250/83.3 IR
3,461,290 8/1969 Webb ............................ 250/83.3 IR

*Primary Examiner*—James W. Lawrence
*Assistant Examiner*—D. C. Nelms
*Attorneys*—Samuel Lindenberg and Arthur Freilich ABSTRACT: A radiometer is disclosed for use in either ambient atmospheric air or a vacuum environment having a black body receptor cavity in a massive heat sink enclosed in a Dewar Flask. A view limiting tube outside a housing is provided with baffles, as is a muffler inside the housing, to protect the cavity from effects of wind. A compensating cavity or mass of thermal capacity is connected to the heat sink via a flange by a thermal resistance equal to a thermal resistance connecting the receptor cavity to the flange. Cold junctions of a thermopile are connected to the receptor cavity. A heating coil is provided for the receptor cavity for calibration. Modifications for various elements or features are also disclosed.

James M. Kendall, Sr.,
INVENTOR.
BY.
Lindenberg & Freilich
ATTORNEY.

3,601,611
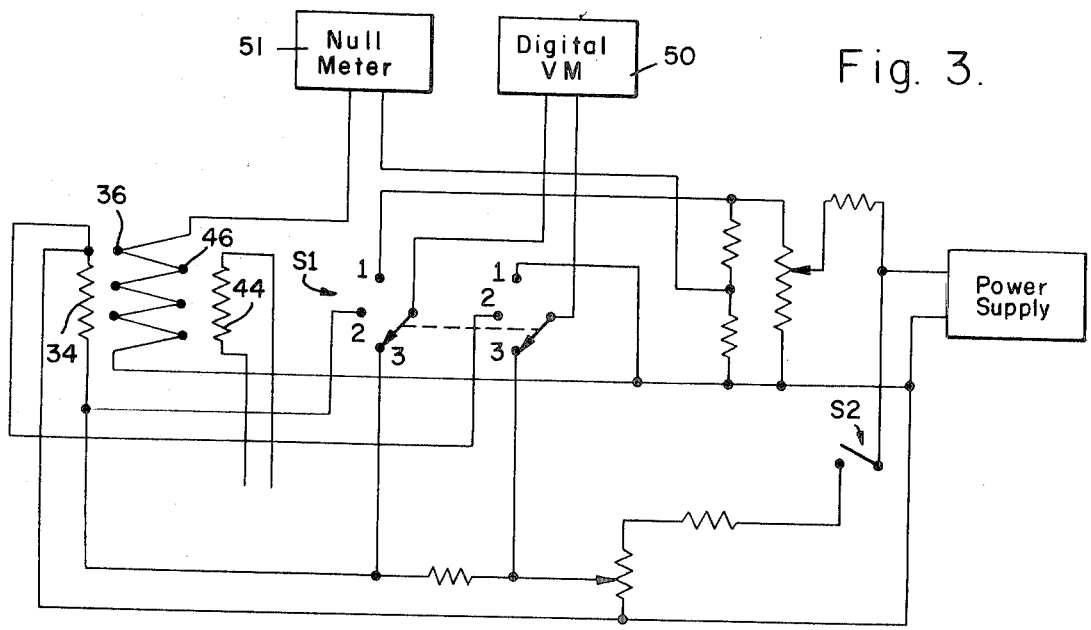
Fig. 3.
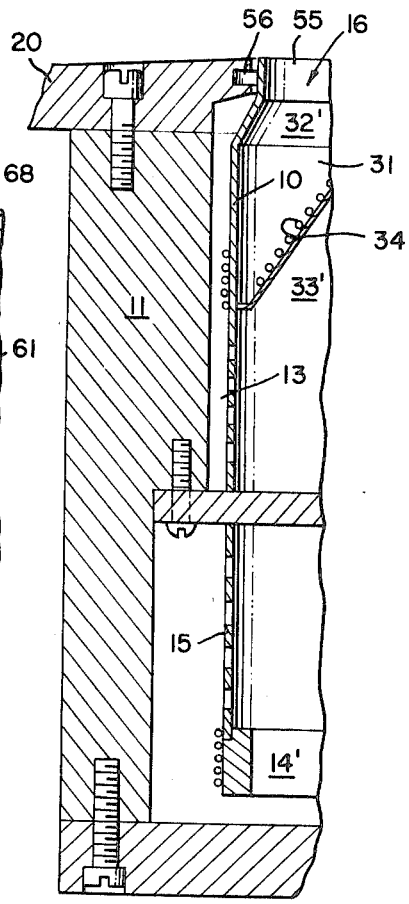
Fig. 4.
Fig. 5.

PRIMARY ABSOLUTE RADIOMETER

ORIGIN OF THE INVENTION

The invention described herein was made in the performance of work under a NASA contract and is subject to the provisions of Section 305 of the National Aeronautics and Space Act of 1958, Public Law 85—568 (72 Stat. 435; 42 USC 2457).

BACKGROUND OF THE INVENTION

This invention relates to total, quantitative readiometery, and more particularly to a primary, absolute radiometer.

The art of measuring irradiant energy throughout the ultraviolet, visible and infrared spectral ranges has become an increasingly more important factor in the success of earth and aerospace scientific activities. For example, thermal equilibrium tests required in a laboratory to verify performance of a spacecraft depend on accurate determination of the equivalency of the synthetic sun to the real sun. That requires two important measurements, viz, of the total irradiant energy to which the spacecraft is subjected during the laboratory tests, and of the sun's total irradiance at a predetermined distance. The latter measurement requires a reliable, lightweight instrument to be carried by a spacecraft to the predetermined distance from the sun.

In earthbound scientific activity, improved radiometers are continually required, such as to review previously accepted standards in order to reference past measurements to a scale which more closely approaches absolute values of irradiance. Applications for more accurate measurements in the scientific, industrial and educational fields include calibration of instruments used, such as instruments used to determine the existence and location of earth resources.

Many radiometers called pyrheliometers have been developed for meteorology using a black surface as a radiation receptor mounted in a housing, sometimes with a window for the purpose of isolating the black surface from wind. However, there is no material that can be used for the window which is completely transparent throughout the entire spectrum. A radiometer in an evacuated housing is thus not entirely satisfactory for measuring solar intensity. What is required is an absolute radiometer which can be operated either in a vacuum or in atmosphere and does not require a window for transmission of the incident radiation to a black body receptor, and one which is operationally simpler than prior art radiometers. Such an absolute radiometer should be sensitive to ultraviolet, visible and infrared radiation for making accurate measurements in the range of intensities from about 10 to 800 milliwatts per square centimeter with an indicated error of less than 0.3 percent. Accordingly, an object of this invention is an improved radiometer for measurement of total radiation in the ultraviolet, visible and infrared ranges. Still another object is to provide a radiometer having an enclosure open to the atmosphere by an aperture through which radiation is received without the radiometer being affected by air current outside of the enclosure.

SUMMARY OF THE INVENTION

These and other objects of the invention are achieved by a black body cavity receptor of high radiative absorptivity mounted in a massive heat sink surrounded by an isothermal enclosure. Calibration is provided for absolute radiation measurements by electrically heating the cavity receptor with electric power in a manner accurately simulating radiative heating with the radiometer capped.

The heat sink temperature can change during an extended period of time. Any effect of this change on the accuracy can be eliminated by recalibrating periodically. It is thus not necessary to control the radiometer temperature.

The receptor cavity is supported in the heat sink by a structure having a predetermined amount of resistance to thermal conduction to provide a temperature drop which is a function of the rate at which radiant energy is being absorbed by the receptor cavity. Means for measuring the temperature drop then provides an absolute radiation measurement. To compensate for the time rate of any change in the heat sink temperature during a measurement, cold junctions of a thermopile, or a second resistive thermometer, is connected to the heat sink through a compensating body having a thermal capacity substantially equal to that of the receptor cavity, and through a supporting structure for the compensating body having a thermal capacity and conductance selected to provide a thermal time constant equal to that of the supporting structure for the receptor cavity. For applications requiring less than 180° viewing, the aperture of the receptor cavity may be provided with a muffler comprising a tube having longitudinally spaced annular baffles within the isothermal housing and a view-limiting tube outside the housing also with longitudinally spaced annular baffles. A servosystem can be employed to provide sufficient power to maintain the receptor cavity temperature at a constant level somewhat higher than would result from the expected radiation intensity to be measured. The difference in power required to maintain temperature constant with radiation is then a measure of the radiation received.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 3 is a circuit diagram for calibration and radiation measurements made with the preferred embodiment of FIG. 1.

FIG. 4 illustrates various modifications of the preferred embodiment which may be incorporated individually or in various combinations.

FIG. 5 illustrates still another embodiment of the present invention.

DESCRIPTION OF THE PREFERRED EMBODIMENTS

Figure 1:
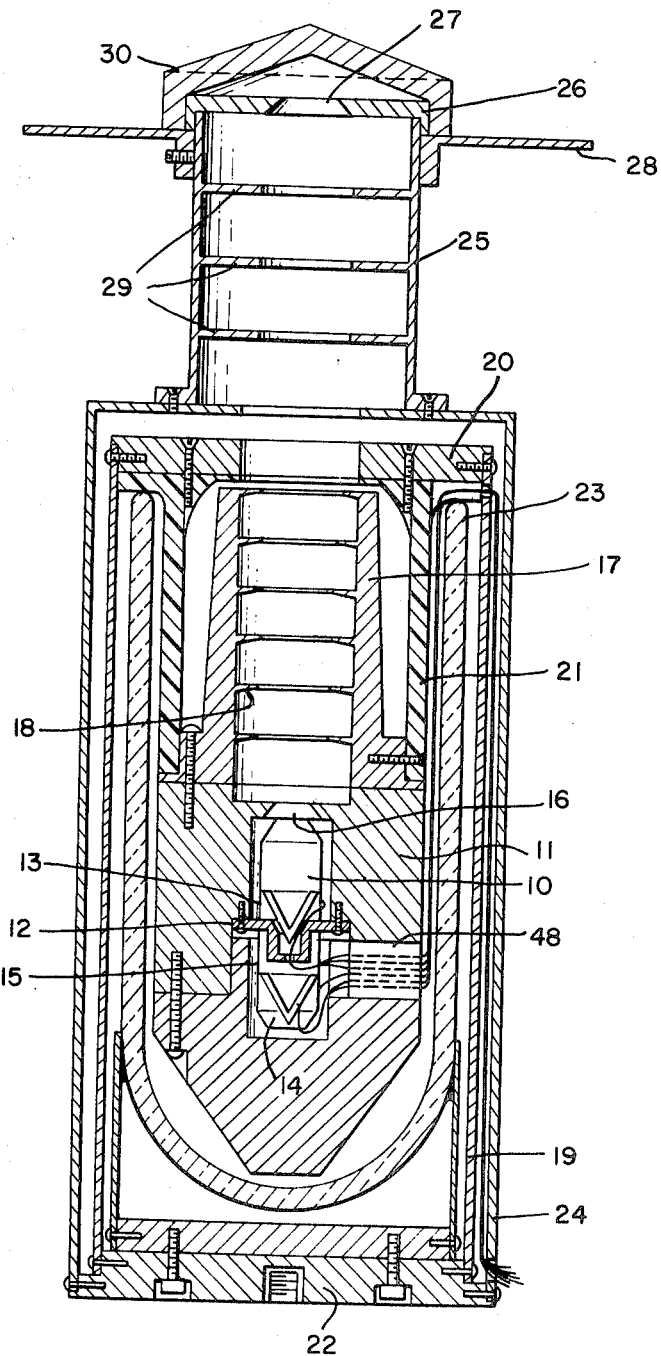
FIG. 1 illustrates the arrangement of parts in a preferred embodiment of the present invention.

FIG. 1 illustrates schematically the general arrangement of parts in a preferred embodiment of the present invention. Briefly, the present invention comprises a receptor cavity 10 mounted in a massive heat sink 11 through a flange 12 and an annular support member 13 having a predetermined resistance to thermal conduction. A delay of 1 minute 8 thermal time constants of the support member 13, where a time constant is equal to a ratio of thermal capacitance to thermal conductance) will allow another measurement of radiation to be made with accuracy. Longer time constants will provide greater sensitivity of the radiometer while measuring, but would require a longer settling time between measurements. Generally an optimum value of thermal time constant is chosen to give full accuracy of measurement with minimal settling time.

The heat sink 11 is formed in two sections to provide a chamber consisting of the space enclosed by the inside surfaces of the two sections. The upper section contains the receptor cavity 10 and a lower section contains a compensating cavity 14. The latter is made of parts identical to parts of the receptor cavity 10, and is connected to the heat sink 12 by an annular support member 15 having resistance to thermal conduction equal to that of the annular support member 13 for the receptor cavity 10.

The heat sink 11 has an aperture 16 of accurate area through which the receptor cavity 10 may receive radiation. If it is to receive radiation from a hemisphere (viewing angle of 180°), the upper surface of the heat sink 11 is sloped downwardly at a small angle around the aperture 16 and the cavity aperture is extended to the outer edge of the heat sink 11 by a hollow cylindrical section (which then accurately defines the aperture area) as will be described more fully with reference to FIG. 4. However, in this preferred embodiment, a more limited viewing angle is desired (such as a half angle of 2.5°) for measuring collimated radiation, such as radiation from the sun. That permits a muffler 17 to be provided comprising a hollow cylinder of thermal conductive material with annular baffles 18 to protect the receptor 10 from air disturbances. The muffler 17 is in perfect thermal contact with the heat sink 11 and acquires the same temperature to within a few thousandths of a degree Kelvin.

The entire assembly thus far described is mounted within a first (inner) housing 19 by suspending it from an inner housing cover 20 using a support member 21 in the form of a hollow cylinder made from thermal insulating material, such as nylon. Supported from the base 22 of the inner housing 19 is a Dewar flask 23 to provide an isothermal environment for the heat sink and cavity assembly.

An outer housing 24 (preferably of metal exteriorly polished to reflect radiation) is placed over the inner housing 19 and cover 20. Apertures in the outer housing 24 and inner housing 20 are of approximately the same diameter as the inside diameter of the muffler 17 and axially aligned therewith as shown over the aperture 16 of the heat sink.

Mounted over the aperture of the outer housing 24 is a view-limiting tube 25 with an aperture 27 the diameter of which defines the viewing angle for the aperture 16. A radiation shield 28 is mounted on the end of the view-limiting tube 25 to reflect direct radiation from the source being measured away from the outer housing 24. The view-limiting tube 25 contains a plurality of annular baffles 29 which, like the baffles 18 of the muffler 17, serve to protect the receptor cavity 10 from disturbances of the air, such as gusts of wind.

All of the exposed surfaces of the annular baffles 29 and the inside of the view-limiting tube 25 are coated with a black matte, such as Parsons' optical black lacquer, in order that radiation from a source not within the limited viewing angle will be absorbed and not reflected through devious paths into the receptor cavity 10. The internal wall and baffles of the muffler 17 are similarly coated with a black matte to absorb any stray radiation received through the view-limiting tube 25.

A cap 30 is placed over the end of the view-limiting tube 25 to prevent radiation from entering the receptor cavity 10 while calibrating. When the cap 30 is removed, the receptor cavity 10 is opened to the atmosphere through the muffler 17 and view-limiting tube 25. Although the baffles eliminate the influence of wind, the receptor 10 is subjected to changes of temperature due to adiabatic compression or expansion of the air which surrounds the cavity 10 inside and out, and fills the muffler 17 and limiting tube 25. Accordingly, to eliminate the effects of such fluctuations of temperature, the compensating cavity 14 is subjected to the same adiabatic changes in the air through passages in the flange 12.

If a thermopile is employed to provide an electrical signal proportional to the difference in temperature between the receptor cavity 10 and the compensating cavity 14, the hot junctions are mounted on the receptor cavity 10 and the cold junctions are mounted on the compensating cavity 14. The electrical connections between the hot and cold junctions are made through passages or slots in the flange 12. If instead, resistive thermometers are used, one is mounted on the receptor cavity 10 and the other is mounted on the compensating cavity 14 without any connection to each other except in electronic circuitry outside of the external housing.

Before describing the operation of the arrangement shown in FIG. 1, details of the receptor cavity 10 and the compensating cavity 14 will be described with reference to FIG. 2. The receptor cavity 10 consists of a hollow cylindrical portion 31 with a hollow frustum 32 on top and a hollow conical portion 33 flanged out at the base thereof to meet the bottom edge of the cylindrical portion 31. A heater coil 34 is wound around the outside of the conical portion 33. A very thin layer of insulating material, such as an epoxy resin, holds the heater coil 34 in close thermal contact with the conical portion 33 so that during calibration, electrical power applied to the coil 34 provides electrical heating in place of radiation heating which might be received through the view-limiting aperture 27 (FIG. 1). The heating coil 34 is completely enclosed by a conical shield 35 in order that all of the heat electrically generated by the coil 34, which is accurately equivalent to radiation heat, flow into the annular support member 13.

The compensating cavity consists of portions 41, 42 and 43 corresponding to the portions 31, 32 and 33 of the receptor cavity, all of which are internally coated with a black matte, such as Parsons' black lacquer. However, the conical portion 43 is arranged inside the other two portions 41 and 42 to conserve space.

In order that a thermal capacity of the compensating cavity 14 be equal to that of the receptor cavity 10, the portions 41, 42 and 43 are identical to the corresponding portions 41, 42 and 43. A dummy heating coil 44 is provided with a conical shield 45 in order not to disturb the equality in thermal capacity between the compensating cavity 14 and the receptor cavity 10.

The receptor cavity 10 includes the heating coil 34 in thermal contact with the conical portion 33 for use in calibration only, unless a servosystem is provided to maintain the cavity temperature constant, in which case calibration is not required. In either case, the compensating cavity 14 is also provided with a dummy heating coil solely for the purpose of having the thermal capacity of the compensating cavity 14 equal to the thermal capacity of the receptor cavity 10. That heating coil is never used; in fact, as will be described further hereinafter, the dummy heating coil and compensating cavity combination may be replaced by any metal body, having a thermal capacity equal to that of the receptor cavity 10, as long as the thermal resistance of its supporting member 15 remains the same.

Figure 2:
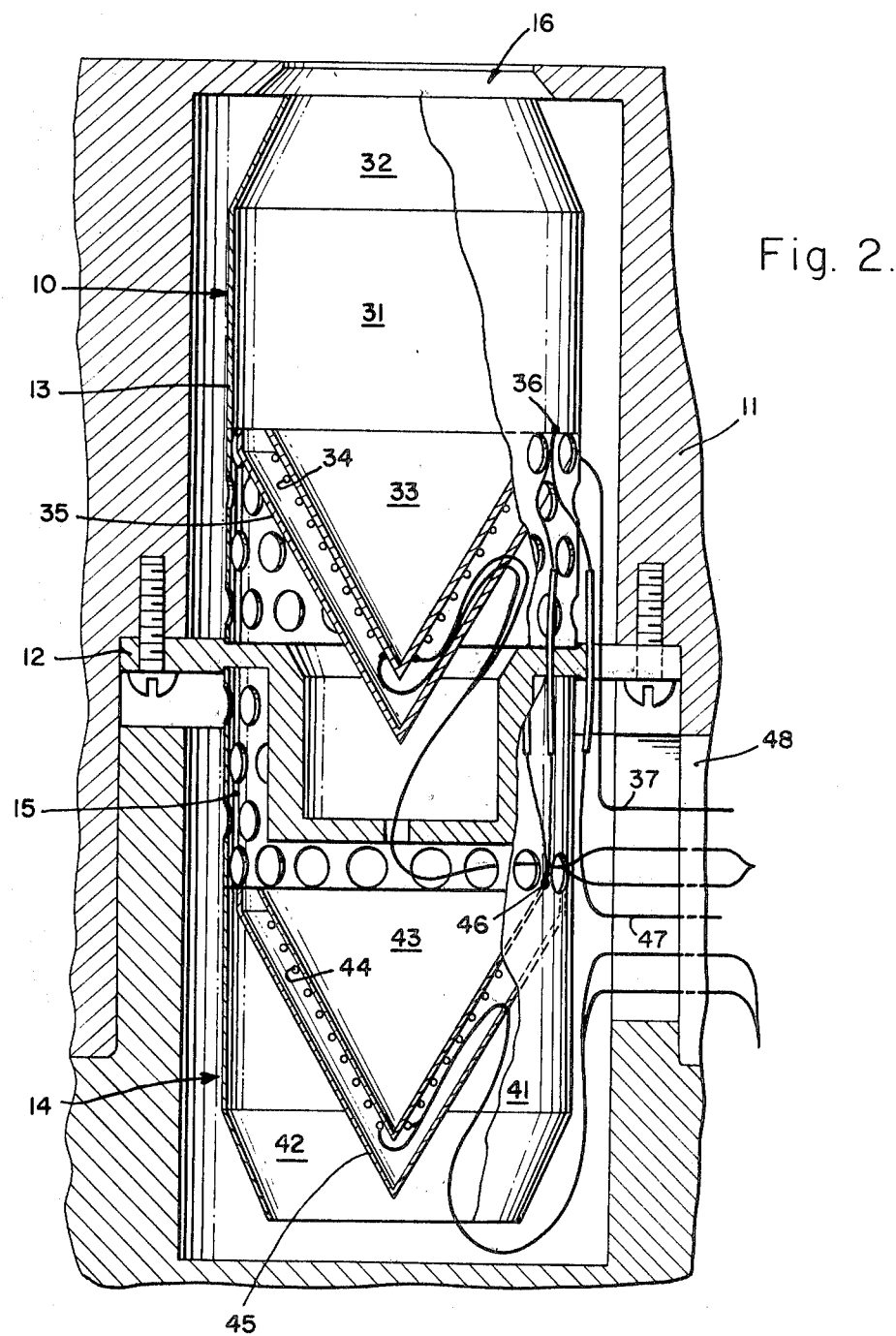
FIG. 2 illustrates in an enlarged view structural details of the central part of the preferred embodiment of FIG. 1.

FIG. 2 illustrates a thermopile having its hot junctions 36 mounted on the reference zone of the cylindrical section 31 of the receptor cavity 10 and its cold junctions 46 mounted on the reference zone of the cylindrical section 41 of the compensating cavity 14. The reference zone is in each case the area directly over where the flange of the conical portion meets the cylindrical portion. Thermopile leads 37 and 47 are then connected to the respective hot and cold junctions 36 and 46, and pass through a heat guard 48 comprising a block of high thermal-conductive material in the wall of the heat sink 11, such as a block of copper with a very thin coating of dielectric material. The function of the thermal guard is to shunt any heat that might otherwise be conducted into the cavities through the thermopile leads. Leads for the heating coil 34 and dummy coil 44 are also passed through the thermal guard 48 for the same purpose. All leads passing into the chamber of heat sink are electrically insulated inside and outside the chamber. Outside the chamber, they extend around the mouth of the Dewar flask 23 as shown in FIG. 1 and from there down to the base of the instrument in the space between the inner and outer housings.

The annular support members 13 and 15 may be soldered to the respective receptor and compensating cavities (but are preferably formed from extensions of the cylindrical portions of the cavities), and soldered to the flange 12 in order to hold the cavities securely in place and provide a heat path of predetermined conductivity from the cavities to the heat sink 11 (via the flange 12). That predetermined conductivity (thermal resistance) is set by the size and number of holes provided through the annular support members 13 and 15. Thus the receptor cavity 10 will convert incoming radiation into heat to raise the temperature of the hot junctions 36 while the cold junctions 46 remain at the same temperature. A radiation measurement is then made by observing the electromotive force (e.m.f.) developed across all of the thermocouples connected in series between the leads 37 and 47.

The area of the view limiting aperture 27 is greater by about twice that of the area of the aperture 16 for a 5° view limiting tube 25. Consequently, a significant amount of radiant energy is being absorbed by the heat sink 11, half through the receptor cavity 10, and half through the view-limiting aperture 16 directly. As a result of this direct absorption of heat, the heat sink temperature will increase slowly (order of 0.0001° K./sec.) as a radiation measurement is made. Without the compensating cavity 14, and annular support member 15 having predetermined thermal resistance, the rate of temperature change in the heat sink would cause an error.

When neither radiation heating nor electric heating is applied to the receptor cavity 10, the e.m.f. across the thermopile goes to zero. Then when either type of heating equivalent to 0.100 watts per square centimeter is applied to he receptor cavity, its temperature is increased about 1° Kelvin or less above the temperature of the heat sink 11, and in measuring this temperature difference the thermopile generates an e.m.f. of about 1 millivolt. As the receptor cavity receives radiation, its temperature increases with a time lag determined by the thermal time constant of the receptor cavity and its annular support which is a predetermined ratio of heat capacity to thermal conductance into the heat sink. Until the thermal capacity of the receptor cavity and its annular support has been reached, no heat flows into the heat sink. Thereafter, the heat sink temperature will begin to increase. While the heat sink is in the process of changing temperature, the thermal time constant of the compensating cavity and its annular support prevents the compensating cavity from following exactly the heat sink temperature. Since the thermal time constants are the same for both cavities, the temperature difference between the two cavities remains constant during the time they are both changing temperature even though the heat sink temperature is increasing, thereby providing compensation for the rate of heat sink temperature increase during measurement of the radiation intensity. The operator need only determine when the thermopile output $e$ has stabilized to take a reading. Otherwise, once the thermal capacity of the receptor cavity and its annular support has been reached, and the receptor cavity has stabilized in temperature, any measurement made of the difference in temperature between the receptor cavity and the heat sink will be in error by the rate at which the heat sink temperature is increasing.

To summarize this important feature, when the heat sink is in the process of changing temperature, if a measurement were made of the temperature difference directly between the hot junctions 36 and the heat sink 11, the rate of heat sink temperature increase would cause an error in the measurement of incoming radiation. In applications where such an error can not be tolerated, the error is eliminated as just described by providing the compensating cavity 14 with a thermal capacity equal to the receptor cavity 10 and an annular support member 15 having a thermal capacity and conductance equal to the thermal capacity and conductance of the annular support member 13.

The heat sink 11 is well insulated by the Dewar flask 23 (FIG. 1) so that it will change temperature at an appreciable rate only when it absorbs or loses heat through the view limiting tube 25, or whenever there is electrical heating of the receptor cavity 10. That appreciable rate is kept very small by providing a large thermal capacity in the heat sink, and excellent isolation by the Dewar flask 23.

This compensating arrangement of the cavity 14 is also beneficial when a change in the ambient air pressure suddenly occurs. This could happen, for example, in the cabin of an aircraft while the radiometer is being used for making a solar measurement at a given altitude. A sudden compression of air increases the air temperature, but since both the receptor cavity 10 and the compensating cavity 14 are equally affected, the temperature difference between the hot and cold junctions of the thermopile remains the same. Hence the radiometer is not affected by a sudden change of air pressure.

Since the incoming beam of radiation passed by the view-limiting tube 25 is received principally by the conical portion 33 of the receptor cavity 10, most of the heating during a radiation measurement takes place in the conical portion. Both of the other portions 31 and 32 will receive some radiation but since all are coated with black matte, the effective blackness (efficiency of absorption) of the receptor cavity 10 for a collimated solar radiation is 0.99. In addition, all portions 31, 32 and 33 of the receptor cavity 10 are made of material having high thermal conductance, such as silver, so that the temperature of the hot junctions 36 will respond to temperatures resulting from radiation with an accuracy better than one-half percent absolute (typically 0.1 percent).

14. A radiometer as defined in claim 11 including a housing for said cavity and a cover for said housing enclosing said cavity in said housing, said cover having an opening over said aperture through which said cavity may receive radiation, means for suspending said heat sink in said housing from said cover, a muffler between said openings of said heat sink and said cover, said muffler comprising a hollow cylindrical member with annular baffles disposed along the internal wall of said member, and a black matte coating on said internal wall of said baffles.

Because the receptor cavity 10 does receive most of the collimated, view limited radiation on the conical portion 33, it is that portion that is receiving direct heat by radiation. To accurately simulate that for calibration, the outside surface of the conical portion 33 is covered by the heating coil 34 to provide heat during calibration (with cap 30 in place as shown in FIG. 1) in a manner accurately equivalent to radiation heating. There is a temperature drop of approximately 0.1 K. (as was determined by measurement) between the heating wire and the silver in the conical portion 33 which produces some excess radiation, but that excess radiation is effectively absorbed by the conical shield 35, or reflected back to the heater coil 34. The heat absorbed by the conical shield 35 is returned to the reference zone (base of the cylindrical portion 31) of the receptor cavity 10 where it was intended to go. Thus, with the heater coil 34 so disposed and shielded, the heating of the cavity 10 produced by electrical current is accurately equivalent to the heating produced by radiation. In other words, heat produced by the heater coil 34 affects the hot junctions 36 in almost exactly the same way as heat produced by absorption of incoming radiation because almost all of the heat, either from the radiation or from electric heating, finds its way to the reference zone of the cylindrical section 31 where the hot junctions 36 are mounted. Moreover, even though the heater coil 34 is 0.1° K. hotter than the silver in the conical portion 33, the conical portion is at almost the same temperature as if there were no 0.1° K. drop because the loss represented by that drop is recovered through the conical shield 35.

For calibration, the cap 30 is placed in the position shown in FIG. 1 so that no radiation will enter the view-limiting tube 25, muffler 17 and receptor cavity 10. Electrical power is then applied to the heater coil 34 to produce heating accurately equivalent to some convenient known intensity of irradiance. From the resulting thermopile e.m.f., a calibration constant $K$ is calculated from the following equation:

$K = WC/e$ where $W$ is the electrical power applied, $e$ is the e.m.f., produced by the thermopile, and $C$ is a correction factor which, for the model shown in FIG. 1, is calculated to be 0.99981. That correction factor accounts for all heat transfers unwanted in the instrument. For example, unwanted air conduction and radiative heat transfers occur from the receptor cavity 10 to the heat sink 11, bypassing the annular support 13, but the effect on accuracy of the radiometer is not as great as might be imagined since the calibrating heat is applied exactly in the same place on the conical section 33 that receives incoming radiation. Therefore, the unwanted conductive and radiative heat transfer that bypasses the annular support 13 is exactly the same proportion of the calibrating heat as the radiative heat. The correction factor $C$ is thus very nearly equal to unity and is employed to account for other sources of error such as the lack of perfect absorptivity of Parsons' black lacquer, and the effect of its thermal resistance.

The correction factor $C$ will vary with different designs which contribute to the nonequivalence of electric heating to radiative heating. However, although design details may vary, in each case the effects of nonequivalent heat transfers can be determined and added or subtracted through the application of a correction factor to obtain an overall result that is correct. The areas of deviation which should be considered for any design are as follows:

1. Difference of temperature distributions between radiative heating and electric heating.
2. Loss of heat by part of the incoming radiation being reflected out, or emitted as infrared radiation, through the aperture 27.
3. Thermal resistance (temperature drop) in the black matte coating of the receptor cavity 10.
4. Emitted infrared radiation into external space due to cavity temperature.

FIG. 3 illustrates schematically an electronic circuit used for radiation measurements and calibration. As noted hereinbefore with reference to FIG. 2, two leads carry thermopile e.m.f. to be measured while four leads are connected to the heater windings 34 and 44. The two leads connected to the heating coil 44 are not used. A two-pole three-position switch $S_1$ permits a digital voltmeter 50 to be so connected as to measure at positions 1, 2 and 3 the thermopile e.m.f., the voltage across the heating coil 34 and current through the heating coil 34, respectively. The last two measurements are made to determine power applied to the heating coil 34 via a switch $S_2$ for calibration.

During calibration, the cap 30 is placed over the aperture 27 (FIG. 1) to prevent radiation from entering the receptor cavity 10. Then the switch $S_2$ is closed and electric power is applied to the heating coil 34. That power is measured very accurately by measuring voltage and current with switch $S_1$ in positions 2 and 3, respectively. Following at, the corresponding thermopile e.m.f. is measured with the switch $S_1$ in position 1. By knowing the e.m.f. from the thermopile for known heating power applied to the receptor cavity 10, a calibration factor $K$ for the radiometer is obtained. Thereafter, upon removing the cap 30 from the aperture 27, values of incident radiation are determined by direct proportion. For example, if a calibration run reveals that 100 milliwatts of heating power causes a thermopile output $e$ of 1 millivolt e.m.f., the calibration factor $K$ would be 100, and a radiation input causing a thermopile e.m.f. of 2 millivolts would indicate that the incident radiation producing that e.m.f. is 200 milliwatts per square centimeter in intensity. Thus, the actual equation for a radiometer measurement is given by the following equation:

$W = CKe + P$ where $C$ is a thermal correction factor for the nonequivalences of the electric heating of the receptor cavity 10 during calibration, $K$ is the calibration factor, and $e$ is the measured thermopile e.m.f. obtained with the cap 30 removed from the aperture 27 (after power has been removed from the heating coil 34 and sufficient time has been allowed for temperatures of the receptor cavity 10 and the compensating cavity 14 to equalize as indicated by a null meter 51). In actual practice, the calibration operation requires about 2 minutes time, not counting time for computing the calibration factor $K$, and radiation intensity measurements can be made with 1 minute thereafter. The constant $p$ is preferably added to the computed value $W$ to account for energy lost by radiation through the aperture 27 which for the arrangement illustrated in FIGS. 1 and 2 was computed to be 0.0834 milliwatts for an aperture area of one square centimeter and 5° viewing angle. If accuracy to within 0.3 percent is not required, calculation and application of the correction factor $C$ and the addition of a constant $p$ to account for energy lost through the aperture 27 are not required.

FIG. 4 illustrates some modifications which may be incorporated in the apparatus illustrated in FIGS. 1 and 2, either individually or in combination. Only half of a sectional view is shown since the structure is symmetrical. The first modification is removal of any view-limiting tube and muffler for hemispherical (180°) viewing. The heat sink 11 is then supported directly from the inner housing cover 20. With such a modification, it may be necessary to control the temperature of the heat sink 11, depending upon the application, such as by a Peltier heat exchange unit or a jacket through which water of a constant temperature is circulated.

To more accurately define the aperture of the receptor cavity 10 without a view-limiting tube, a short hollow cylindrical section 55 is added with an inside diameter equal to the desired aperture diameter. Then to virtually eliminate the possibility of incident radiation entering the space between the cavity 10 and the heat sink 11, a radiation guard is added in the cover 20 in the form of an annular groove 56 coated with a black matte. Most of the radiation which would tend to enter the space between the cavity 10 and the heat sink 11 is absorbed by such a radiation guard, and any radiation which gets by the guard is reflected by the external surfaces of the sections 31 and 32 of the cavity 10 into the heat sink 11 since both of the sections 31 and 32 are made of silver and highly polished on the outside. If the inside wall of the heat sink 11 is also blackened, radiation reflected by the external walls of the sections 31 and no heating of the receptor cavity 10 will result from any radiation entering the space between the cavity and the heat sink.

It should be noted that removal of the view limiting tube and muffler to provide 180° viewing will make the instrument subject to wind disturbances, but not to fluctuations of temperature due to adiabatic compression or expansion of the surrounding air. That is because the compensating cavity shown as an annular body 14' and the annular supports 13 and 15 having substantial resistance to thermal conduction, but of course not such high resistance that, after a calibration or radiation measurement, too much time will be required for the temperatures of receptor cavity and the compensating cavity to equalize at the temperature of the heat sink. Thus, even though the effect of sudden pressure changes is eliminated, the effect of air currents, (wind) is not eliminated. A 180° viewing instrument will require a still air environment which can be provided by a hollow glass dome over the radiometer.

The provision of the compensating cavity in the form of an annular mass 14' conserves space and manufacturing costs. To achieve that modification, it is simply necessary to determine the total thermal capacity of the receptor cavity 10 and its heating coil and shield, and then provide the annular mass 14' with equal thermal capacity.

Another modification which may be used individually or in combination with other modifications is an inverted conical section 33' with the heating coil 34 now inside the receptor cavity 10. The heating coil 34 is electrically insulated from the conical section 33' as before by a thin layer of electrical insulating material, such as an epoxy resin, but is otherwise in good thermal contact to transfer radiant heat during a radiation measurement and electrical heat during calibration.

In order to receive and transfer radiant heat to the conical section 33', all exposed areas of the heating coil 34 are coated with a black matte just as all inside surfaces of the cavity are coated. This arrangement of the conical section 33' has all of the advantages of the conical section 33 shown in FIG. 2, namely the ability to reflect any radiation not absorbed into the inside walls of he sections 31 and 32. In order that the heating coil 34 not detract significantly from that, a very fine wire may be used for he coil such that, upon being coated with a black matte, a substantially smooth surface is presented to incident radiation. Alternatively, the heating coil 34 may be placed outside the cavity 10 as before, but an advantage to having it inside the cavity 10 is that a heater shield is not required such as the conical shield 35 shown in FIG. 2. Moreover, the heating of the cavity 10 with electrical power during calibration involves virtually no losses since heat not transferred directly to the conical section 33' is radiated to the walls of the sections 31 and 32 where it is absorbed, thereby providing accurate equivalence of electrical heating to radiation heating and hence providing more accurate calibration.

Still another modification shown in Fig. 5 is the omission of a compensating cavity in which case the cold junctions of the thermopile are connected directly to the heat sink. While the omission of the compensating cavity will render the instrument sensitive to fluctuations of temperature due to adiabatic compression or expansion of the surrounding air, all of the other advantage of the apparatus illustrated in FIGS. 1 and 2 with any of the other modifications described with reference to FIG. 4 will still provide a radiometer which will perform satisfactorily for many purposes.

Yet another modification which can be used with the embodiment illustrated in FIGS. 1 and 2, either by itself or in combination with other modifications, is the substitution of resistive thermometers for the thermocouples. For example, a first coil of thin wire made of material having a high thermal coefficient of resistance, such as platinum, may be provided in place of the cold junctions, and a second coil of the same wire may be provided in place of the hot junctions. The two coils may then be connected as adjacent branches of a Wheatstone bridge to provide an output signal which is proportional to the temperature difference of the two coils. That voltage output, or the e.m.f. produced by a thermopile may be used to control power applied to the heating coil 34 of the cavity 10 for a conventional servo operation in which the cavity temperature is maintained constant at a level higher than that expected to be reached solely with incident radiation. The decrease in power applied to the heating coil required to maintain temperature constant is then a measure of the radiation being received. An advantage of such a servo operation is greater speed in making measurements of radiation intensity.

A measurement with a servosystem is made by establishing the desired temperature of the receptor cavity with the instrument aperture covered, and noting the current $I_1$ through the heater coil having a resistance $R$. When the aperture is uncovered, radiation passing through the aperture from the outside decreases the current necessary to maintain the cavity temperature constant. The decreased level of current $I_2$ is noted and the irradiating intensity measured is given in watts ($W$) by the following equation:

$W/cm.^2 = 1/\alpha A (I^2_1 R - I^2_2 R)$ where $\alpha$ is the absorptivity of the black matte coating of the cavity and $A$ is the area of the cavity aperture.

Referring now to FIG. 5, in which only half of a cross section is shown since the assembly is symmetrical as in other embodiments, the inside surface of a receptor cavity is coated with a black matte and the outside surface is wound with a heating coil 61. A shield 62 is provided over the heating coil as in the embodiment of FIG. 1.

A thermal resistor 63 is provided to support the receptor cavity 60 inside a heat sink 64. That is accomplished, as in the embodiment of FIG. 1, by soldering one end of the thermal resistor to a flange 65 and the other end to the cavity 60. In that manner the thermal resistor 63 alone will control the time required for the temperature of the cavity 60 to reach the temperature of the heat sink 64 after calibration or a radiation measurement, particularly when temperature-sensing elements 66 and 67 in the form of resistance thermometers are employed to measure the difference in the temperatures of the cavity and heat sink.

The temperature-sensing resistors are preferably provided in the form of coils of fine electrically insulated wire in thermal contact with the heat sink using a metal having a high thermal coefficient of resistance for the wire. The difference in temperature between the cavity and the heat sink is then measured with a Wheatstone bridge arrangement according to conventional temperature-measuring techniques.

The area through which the cavity 60 receives radiation is defined accurately by an aperture 68 in the heat sink as in the embodiment of FIGS. 1 and 2. Although the upper surface of the heat sink is shown to be flat, in order to receive a baffle for a limited viewing angle, it should be understood that the upper surface may be sloped as in the FIG. 4 for receiving radiation over a wide angle such as 180° (hemispherical viewing angle). A cylindrical section should then be added to the conical cavity to extend it to the outer edge of the heat sink, in which case the inside diameter of the cylindrical section accurately defines the area of the cavity aperture.

It should be noted that although the assemblies of FIGS. 4 and 5 are shown without any means for shielding the heat sink from radiation, and for otherwise providing an isothermal environment, as in the embodiment of FIG. 1, such means would be provided as required. Alternatively, means may be provided to maintain the temperature of the heat sink constant as noted hereinbefore. In the configuration of FIG. 5, it would be of particular advantage to have the heat sink temperature controlled since a compensating cavity is not employed as in the configurations of FIGS. 2 and 4 to isolate the reference temperature-sensing element 67.

What is claimed is:

1. In a radiometer, the combination comprising:
   a heat sink having a chamber and an aperture communicating with said chamber, said aperture having a precisely known area;
   a black body receptor disposed in said chamber in a position to receive radiation through said aperture;
   a supporting member for holding said receptor stationary out of contact with said heat sink, said receptor-supporting member having a given resistance to heat flow from said receptor to said heat sink;
   a compensating body disposed in said chamber in a position not to receive radiation through said aperture, said body having a thermal capacity equal to that of said receptor;
   a supporting member for holding said body stationary out of contact with said heat sink, said body-supporting member having a resistance to heat flow from said heat sink to said body substantially equal to said given resistance; and
   means for measuring any difference in temperature between said radiation receptor and said compensating body without affecting the substantial equality of thermal capacities of said receptor and said body, said temperature difference being a measure of radiation intensity being received by said receptor.

2. The combination of claim 1 including a housing surrounding said heat sink to shield said heat sink from radiation, said housing including means for limiting the view of a radiation source by said receptor through said heat sink aperture.

3. The combination of claim 2 including a muffler comprising a tubular member of a thermal conductive material with annular baffles axially disposed between said view limiting means and said heat sink aperture, said muffler being in thermal contact with said heat sink.

4. The combination of claim 3 wherein said view-limiting means includes a tubular member extending from said housing and axially aligned with said muffler and heat sink aperture.

5. The combination of claim 3 including a thermal insulating jacket separating said housing from said heat sink and muffler.

6. In a radiometer, the combination comprising:
   an internally blackened radiation receptor cavity;
   a heat sink having very large thermal capacity in comparison to said cavity;
   a supporting member for spacing said cavity away from said heat sink a given distance, said member having a given resistance to heat flow;
   a compensating body having a thermal capacity substantially equal to the thermal capacity of said cavity;
   a supporting member for spacing said body away from said heat sink a given distance, said body-supporting member having a resistance to heat flow substantially equal to said given resistance;
   means for shielding said heat sink receptor cavity, compensating body and supporting members from external radiation except into said cavity;

means for limiting radiation into said cavity through a precisely known area outside of said cavity;

means for measuring any difference in temperature between said radiation receptor cavity and said compensating body, said difference being a measure of radiation intensity being received by said receptor cavity; and means for electrically heating said cavity in a manner substantially equivalent to heating said cavity by radiation to calibrate said measuring means.

7. The combination of claim 6 wherein said receptor cavity comprises a hollow cone made of material having high thermal conductance positioned to receive radiation from said aperture, said aperture being centered on the axis of said cone, and disposed in a plane perpendicular to said axis, and wherein said electrical heating means comprises a coil in thermal contact with said cone.

8. The combination of claim 7 wherein said cone is disposed to receive radiation in its conical cavity and said heating coil is in thermal contact with the external surface of said cone, and including a conical shield made of high thermal conductive material spaced over said heating coil, the space between said receptor cavity cone and said conical shield being closed by a radially extending portion of said cone at the base thereof, whereby radiant heat from said heating coil absorbed by said shield is conducted into said receptor cavity.

9. The combination of claim 7 wherein said compensating body comprises a structure of parts substantially identical to parts from which said receptor cavity is made, including said hollow cone, and a dummy coil in thermal contact with a part of said body corresponding to said hollow cone of said conical cavity, said dummy coil being substantially identical to said heating coil.

10. The combination of claim 6 wherein said radiation receptor cavity comprises:

a hollow cylindrical portion disposed with its axis centered on the axis of said aperture to receive radiation through one end thereof, a hollow conical portion disposed within said cylindrical portion with the axis of said conical portion along the axis of said cylindrical portion, and having its base in thermal contact with said cylindrical portion around its entire circumference at the end thereof opposite said one end, and wherein said heating means comprises a coil in thermal contact with said cone on the surface thereof surrounded by said cylindrical portion.

11. A radiometer comprising:

a radiation-receiving cavity internally coated with a black matte, said cavity having an aperture and being made of metal having substantially high thermal conductance;

a heat sink surrounding said cavity, said heat sink having an opening over the aperture of said cavity;

a supporting member for holding said cavity stationary out of contact with said heat sink, said member having a predetermined resistance to heat flow from said cavity to said heat sink, said predetermined resistance being selected to provide a time constant of not more than a fraction of one minute; and means for measuring any difference in temperature between said cavity and said heat sink, said difference being a measure of radiation intensity being received by said receptor.

12. A radiometer as defined in claim 11 wherein said last named means comprises:

a compensating mass having a thermal capacity substantially equal to the thermal capacity of said cavity, said mass being surrounded by said heat sink;

a supporting member holding said mass stationary out of contact with said heat sink, said mass supporting member having a resistance to heat flow from said heat sink to said mass substantially equal to said predetermined resistance to heat flow of said cavity support member; and separate temperature sensing elements thermally connected to said cavity and said compensating means.

13. A radiometer as defined in claim 11 including:

a heating coil in thermal contact with said cavity; means for applying power to said coil while said cavity is not receiving radiation; and means for measuring power applied to achieve a measured temperature difference, whereby said radiometer may be calibrated.

15. A radiometer as defined in claim 14 including a view-limiting tube attached to said housing and axially aligned with said muffler, said view-limiting tube having a cap on the end thereof with an aperture of desired diameter, and annular baffles disposed along the internal wall of said tube.

16. In a radiometer, the combination comprising:

an internally blackened receptor cavity comprising thermally connected parts;

a heat sink;

a supporting member spacing said receptor cavity away from said heat sink, said member having a given resistance to thermal conduction sufficient for a significant time lapse to attain steady heat flow from said cavity through said supporting member into said heat sink;

a compensating cavity comprising thermally connected parts substantially identical to parts of said receptor cavity; and a supporting member spacing said receptor cavity away from said heat sink in a position shielded from radiation intended to be received by said receptor cavity, said member being substantially equal to said supporting member for said receptor cavity in both thermal capacity and thermal resistance.

17. The combination as defined in claim 16 including a heating coil having each turn thereof placed in close thermal contact with said receptor cavity.

18. The combination of claim 17 wherein said heat sink surrounds said receptor and compensating cavities except over said receptor cavity on the end thereof intended to receive radiation, said heat sink having an aperture of known area over said end.

19. The combination of claim 18 including means surrounding said heat sink except over said area for thermally insulating said heat sink from ambient thermal radiation.